(12) United States Patent
Bankmann et al.

(10) Patent No.: US 9,340,713 B2
(45) Date of Patent: May 17, 2016

(54) ADHESIVES HAVING ADHESION PROMOTERS WITH SULPHONAMIDE GROUPS

(71) Applicant: Henkel AG & Co. KGaA, Duesseldorf (DE)

(72) Inventors: Dennis Bankmann, Duesseldorf (DE); Nina Jungholt, Issum (DE); Stefan Tomke, Oberhausen (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 15 days.

(21) Appl. No.: 14/556,720

(22) Filed: Dec. 1, 2014

(65) Prior Publication Data

US 2015/0083327 A1    Mar. 26, 2015

Related U.S. Application Data

(63) Continuation of application No. PCT/EP2013/061288, filed on May 31, 2013.

(30) Foreign Application Priority Data

Jun. 1, 2012 (DE) .......................... 10 2012 209 268

(51) Int. Cl.
| | | |
|---|---|---|
| *C09J 167/02* | (2006.01) | |
| *C09J 5/00* | (2006.01) | |
| *C08K 5/43* | (2006.01) | |
| *C09J 175/04* | (2006.01) | |

(52) U.S. Cl.
CPC ................. *C09J 167/02* (2013.01); *C08K 5/43* (2013.01); *C09J 5/00* (2013.01); *C09J 175/04* (2013.01)

(58) Field of Classification Search
CPC .................................. C09J 167/20; C09J 5/00
USPC ........................................ 156/331.7; 524/604
See application file for complete search history.

(56) References Cited

U.S. PATENT DOCUMENTS

| | | | |
|---|---|---|---|
| 3,046,262 A | | 7/1962 | Krieble |
| 5,272,224 A | * | 12/1993 | Baghdachi ............ C03C 27/048 524/188 |
| 5,476,889 A | * | 12/1995 | Owen .................. C08G 65/333 524/170 |
| 5,478,652 A | | 12/1995 | Grootaert et al. |
| 6,232,431 B1 | | 5/2001 | Hosoki |
| 6,958,368 B1 | | 10/2005 | Klemarczyk et al. |
| 2001/0031367 A1 | | 10/2001 | Gilbert |
| 2009/0277356 A1 | | 11/2009 | Jacobine et al. |

FOREIGN PATENT DOCUMENTS

| | | |
|---|---|---|
| DE | 19940261 | 3/2001 |
| DE | 69802000 | 11/2001 |
| WO | 2011042267 | 4/2011 |

OTHER PUBLICATIONS

International Search Report issued in connection with International Patent Application No. PCT/EP2013/061288 mailed on Jul. 24, 2013.

* cited by examiner

*Primary Examiner* — Daniel Lee
(74) *Attorney, Agent, or Firm* — James E. Piotrowski

(57) ABSTRACT

Adhesive for adhering synthetic and/or metal substrates, selected from liquid or thermoplastic adhesives which have urethane groups in the polymer chain, wherein the adhesive is selected from NCO-reactive adhesives, silane-reactive adhesives or thermoplastic polyurethanes (TPU) and include as a constituent 0.01 to 10 wt. % of at least one compound (H) having a molecular weight of less than 500 g/mol, which compound has at least one sulphonamide group having an $SO_2$—NH—C(O) structure or at least one amidosulphonate group.

10 Claims, No Drawings

ADHESIVES HAVING ADHESION PROMOTERS WITH SULPHONAMIDE GROUPS

The invention relates to adhesives for bonding plastic or metal substrates, which contain an adhesion promoter that contains sulfonamide groups. The invention further relates to a method for adhesively bonding film-shaped substrates with an adhesive that contains an adhesion promoter having sulfonamide groups.

It is known that adhesives exhibit different adhesion properties with respect to various substrates. This problem can be avoided by using a specially adapted adhesive depending on the substrate. This is, however, very burdensome. It is furthermore known that adhesion can be improved by pretreating the substrate surface. Known systems for doing so, however, e.g. plasma or corona treatment or flame treatment, are likewise burdensome. On the other hand, it is also known to add adhesion promoters to adhesives. Examples thereof are reactive adhesion promoters based on alkoxysilanes. While film substrates are often processed in industrial facilities, adhesive bonds to solid substrates also need to be carried out as an individual bonding step. Pretreatments are more difficult to carry out in this context. Here as well, the known adhesion promoters are used.

WO 2011/042267 describes a method for adhesively bonding films. A two-component polyurethane adhesive having special adhesion promoters, which enables good adhesion to the various substrates, is provided here. These adhesion promoters must comprise carboxyl groups, α-hydroxyketo groups, or β-diketo groups as a structural feature. Various carboxylic acids, esters, ketones, or dihydroxy compounds are described.

U.S. Pat. No. 3,046,262 describes anaerobically crosslinking compositions that contain acrylate groups comprising polyethers. Sulfimides are furthermore described as a constituent of the catalyst composition. Exclusively anaerobically crosslinking systems based on acrylates are described.

EP 1 013 735 B1 describes anaerobically curable sealing compositions having urethane acrylate prepolymers. Saccharine is used as a curing accelerator. The composition is said to connect metal surfaces in sealing fashion. Inert materials such as plastic surfaces can be connected to metallic surfaces within a short period of time only by using a primer that contains a reducing agent. As is generally the case with anaerobic adhesive or sealing compositions, curing is impaired in the presence of air or oxygen. Curing of the sealing agent in the presence of oxygen, i.e. under aerobic conditions, is successful only as a result of additional priming of the surfaces with a reducing agent.

US 2009/0277356 A1 discloses anaerobically curing (meth)acrylate-based adhesive compositions. Besides other compounds, saccharine is also recited as a curing accelerator. The (meth)acrylate-based contained in the adhesive composition can also comprise urethane groups as functional groups, for example those that result from reacting isocyanate compounds with hydroxy compounds in the manufacture of one of the possible adhesive compositions. An incomplete reaction can result in residual quantities of NCO-functionalized compounds. These are not NCO-reactive adhesives, however, which are notable for the fact that curing thereof is based on a crosslinking reaction of the NCO groups.

U.S. Pat. No. 6,958,368 B1 discloses curing accelerators for anaerobically curing compositions from the group of sulfinimides, sulfonimides, and sulfonamides, as well as corresponding oxygen and sulfur derivatives. The anaerobic adhesive compositions are based on (meth)acrylates that can also contain, among others, urethane groups as additional functional groups. These are not adhesive compositions that cure under aerobic conditions.

DE 199 40 261 A1 discloses water-soluble hot melt adhesives for adhesive bonding of paper, which adhesives can be applied, for example, by spraying. Polyurethanes are listed as a hot melt adhesive, alongside polyacrylates, polyesters, polyalkylene glycols. In order to enable a visual assessment of the spray pattern, a UV-active fluorescent dye is mixed into the hot melt adhesive. Among these dyes are, among others, sulfamidophenyl compounds or also amidosulfonylphenyl compounds. These compounds carry Ph-$SO_2$—$NH_2$ groups and do not comprise the sulfonimide or amidosulfonic acid/amidosulfonate groups that are particularly suitable for adhesion promotion.

US 2001/0031367 A1 discloses electrically releasable adhesive compositions based on epoxy resins, phenol resins, melamine resins, maleimide resins, acrylic resins, or also polyurethanes. The compositions additionally contain electrolytes. The electrolytes dissolved in the adhesive composition result in ionic conductivity in the adhesive and ensure that upon application of an electrical voltage, redox reactions can occur at the surface of the adhesively bonded electrically conductive substrate, which ultimately result in loss of adhesive strength. Lithium trifluoromethanesulfonimide is recited, among others, as a suitable electrolyte. This compound does not comprise the sulfonimide or amidosulfonic acid/amidosulfonate groups suitable for adhesion promotion, and moreover is toxic upon contact with the skin and when swallowed.

It is known that adhesion promoters are often used for adhesive bonding of solid substrates. It is thereby possible to partly avoid burdensome pretreatments. This is also important in particular for metal surfaces.

Multi-layer films are commonly known in the packaging industry as flexible substrates. They can be constructed from two and more layers, the individual layers respectively being bonded to one another as films. These films can be made of polymers, for example thermoplastic polymers; paper layers can also be contained, as well as metal foils. Metallized films can also be used. Imprinted films are also often adhesively bonded. Adhesives for this type of bonding are known in a variety of forms, such as water-based adhesives, hot melt adhesives, or reactive adhesive systems.

It is known that such adhesives are often used for bonding films for the food industry or pharmaceutical industry. In such application sectors it is particularly important that the initial materials which are used will not be able, if at all possible, to migrate into the contents, and that they also be unobjectionable in terms of health. Migration can be decreased, for example, by a high molecular weight. It is intended that, in order to achieve a uniform and durable bond, all constituents of the adhesive be incapable of migrating to the surface after curing.

An additional problem that exists for a composite of metal surfaces and plastic films is that adhesion to the metal surface is insufficient. Colored complexes with adhesive constituents can also form on metallic substrates, resulting in an impaired appearance when bonded to transparent films. It is also known, however, that imprinted surfaces can produce problems when bonded.

Anaerobic adhesives or sealing agents typically contain (meth)acrylate compounds, peroxides, inhibitors, and curing accelerators. Cleavage of the peroxides releases radicals that initiate polymerization of the (meth)acrylate compounds and thus result in curing. This process is influenced by a number of redox processes that can in turn be controlled by suitable curing accelerators, among them e.g. sulfimides, sulfamides, or sulfonimides. The peroxides here are cleaved both reductively and oxidatively by redox reactions with metal ions. The metal ions pass through different oxidation states in this catalysis cycle. Curing accelerators such as saccharine serve to release the catalytically effective metal ions from the surface to be bonded, make them available for curing of the adhesive, and thus accelerate the reaction. Curing is influenced by reducing or oxidizing agents, and becomes more difficult in the presence of atmospheric oxygen. Conversely, the presence of atmospheric oxygen, in interaction with the inhibitors, ensures long shelf stability for the composition. Curing takes place only in the absence of oxygen and in the presence of metal ions that derive, for example, from the metallic substrate to be bonded. Adhesive bonding of plastic surfaces using anaerobic adhesives is generally not possible without further pretreatment.

The object of the present invention is therefore to make available an adhesive that encompasses an adhesion promoter, that yields colorless products, and that is also less objectionable in terms of health. The adhesion promoter is intended to be capable of being incorporated in shelf-stable fashion into the adhesive; in addition, migration out of the adhesive is intended to be low. This adhesive is intended to ensure good adhesion onto the various substrates, and in particular also to enable adhesive bonding of nonmetallic surfaces. The adhesive is furthermore intended to be able to cure under both aerobic and anaerobic conditions.

The object is achieved by an adhesive for bonding plastic substrates and/or metal substrates, selected from liquid or thermoplastic adhesives that comprise urethane groups in the polymer chain, characterized in that the adhesive is selected from NCO-reactive adhesives, silane-reactive adhesives, or thermoplastic polyurethanes (TPUs) and contains as a constituent 0.01 to 10 wt % of at least one compound (H) having a molecular weight below 500 g/mol that comprises at least one sulfonimide group having an $SO_2$—NH—C(O) structure, or at least one amidosulfonate group.

If the substances are used in deprotonated or protonated form as an ionic constituent of a salt, the molecular weight then refers to the corresponding neutral form that can be obtained by respective protonation or deprotonation of that ionic constituent. The amidosulfonate group in particular can be present in protonated form as an amidosulfonic acid group, or in deprotonated form as an anionic group.

The invention further relates to a method for adhesively bonding substrates, wherein a corresponding adhesive containing a compound (H) is used. The invention further relates to a multi-layer film that is adhesively bonded using a corresponding adhesive.

Methods for adhesively bonding solid or film-shaped substrates are commonly known. Different adhesives can be used therein. In accordance with the present invention, adhesives based on polyurethanes are used; these are easy to process and yield good adhesion to the bonded substrates. Good compatibility with the adhesion-promoting compounds used according to the present invention is provided by the urethane groups that are contained.

Known substrates made of plastic and/or metal can be used as substrates in the method according to the present invention. These can be rigid, solid, or flexible substrates. The surfaces can also be pretreated, for example coated or imprinted. Identical or different substrates can be bonded. It is likewise possible for one surface of a substrate to be made of different materials, for example ceramic or stone. In an embodiment, two solid or one solid and one flexible substrate can be adhesively bonded to one another. In particular, one substrate comprises a metal surface.

In a particular embodiment, flexible film-shaped substrates known per se, such as plastic films, metal foils, paper films, or paperboard are adhesively bonded to one another. They are adhesively bonded, in one or more layers, into multi-layer films.

Known flexible films can be used as film materials for the manufacture of such multi-layer films in accordance with the method according to the present invention. These are substrates made of thermoplastics in film form, for example polyolefins such as polyethylene (PE) or polypropylene (PP, CPP, OPP), polyvinyl chloride (PVC), polystyrene (PS), polyesters such as PET, polyamide, natural polymers such as cellophane or paper. The film materials can also be modified at the surface, for example, by modifying the polymers with functional groups; additional components, for example pigments, dyes, can be contained, or foamed layers are contained in the film. The films can be colored, imprinted, colorless, or transparent. The films can furthermore be subjected to a surface treatment, for example corona or plasma treatment or flame treatment.

In a particular embodiment the adhesive according to the present invention is suitable for adhesive bonding of film materials wherein one substrate comprises a metal surface, in particular an aluminum surface. These can be metal foils, in particular an aluminum foil, or can be plastic films that comprise an aluminum-coated surface.

Multi-layer films can be manufactured from the corresponding flexible film materials together with the adhesives according to the present invention.

An adhesive suitable according to the present invention can be selected from two-component polyurethane adhesives, one-component polyurethane adhesives, thermoplastic polyurethane adhesives, or silane-crosslinking adhesives known per se. These adhesives according to the present invention contain urethane groups in the polymer chain, for example in prepolymers and/or after crosslinking in the polymer network. These adhesives are intended to contain as an additional constituent a compound (H) that comprises sulfonimide groups or amidosulfonate groups.

Thermoplastic adhesives, in particular thermoplastic polyurethane adhesives, are a group of suitable adhesives. These are nonreactive hot melt adhesives that contain as a binding agent a polyurethane polymer manufactured by reacting one or more polyols and polyisocyanates. These thermoplastic polyurethanes (TPUs) comprise a number of urethane groups that are also capable of forming hydrogen bonds. TPUs are mostly of linear construction; they are intended to contain no reactive NCO groups. The molecular weight, viscosity, and melt behavior of the TPUs can be influenced via the selection of the polyols and isocyanates. TPUs are solid at room temperature; they can usually be melted and applied at temperatures above 100° C. Adhesive bonding occurs by solidification upon cooling. The thermoplastic adhesive contains these thermoplastic polyurethanes in a quantity of more than 20 wt %, preferably more than 50 wt %, even more preferably more than 80 wt %, but in particular 90 to 99.99 wt %.

Reactive adhesives that can crosslink via silane groups are another group of suitable adhesives. They are also referred to as "silane-reactive" adhesives. These contain as a crosslinking constituent polymers that contain urethane groups. The backbone of the polymers can be constructed in particular of polyethers, or of poly(meth)acrylates that contain hydrolyzable silane groups on the polymer chain. Suitable silane groups are silane groups having hydrolyzable residues, for example di- or trialkoxysilane groups having C1 to C4 alkoxy groups. By way of these hydrolyzable functional groups, the adhesives can crosslink after application. The silane-reactive adhesive contains these polymers in a quantity of more than 20 wt %, preferably more than 50 wt %, even more preferably more than 80 wt %, but in particular 90 to 99.99 wt %.

Examples of suitable polymers are polyoxyalkylene prepolymers having at least two hydrolyzable silane groups. These silane-containing prepolymers can be obtained, for example, from polyether diols by reaction. The OH groups can be reacted with isocyanatosilanes so that silane groups become reacted onto the polymer. Polyether polyols can also be reacted with isocyanates so that NCO-terminated prepolymers are produced. The free NCO groups can then be reacted with silane compounds.

Other suitable prepolymers are those based on poly(meth)acrylates, which likewise comprise at least two hydrolyzable silane groups on the polymer chain. These are polymerization products of alkyl(meth)acrylate esters that still contain OH groups. As already described, these can be reacted with isocyanatosilanes, or they are reacted first with isocyanates and then with silane-group-containing compounds. Such polymers are known to one skilled in the art and are commercially obtainable.

One-component polyurethane adhesives are a preferred group of suitable adhesives. These contain as a principal constituent polyurethane prepolymers that still comprise free NCO groups. The one-component polyurethane adhesives contain polyurethane prepolymers in a quantity of more than 20 wt %, preferably more than 50 wt %, even more preferably more than 80 wt %, but in particular 90 to 99.99 wt %. The prepolymers are reaction products of OH-group-carrying or NH-group-carrying compounds with an excess of polyisocyanates. The polyols and polyisocyanates usable in the manufacture of the polyurethane prepolymers are known to one skilled in the art. These are polyols known for adhesive utilization, or corresponding compounds, having secondary and/or primary amino groups, as well as preferably diisocyanates. The polyols can be, for example, ones based on polyethers, polyesters, polyolefins, polyacrylates, or alkylene polyols. Initial compounds containing OH groups are preferred. Polyols having a molecular weight of up to 20,000 g/mol, in particular from 100 to 10,000 g/mol (number-average molecular weight MN as determinable by GPC), are particularly suitable for synthesis of these prepolymers. The number of NCO groups, molecular weight, and viscosity of the polyurethane prepolymer can be influenced by the quantity of polyisocyanates relative to the polyols.

Two-component polyurethane adhesives are another preferred group of preferred adhesives. These contain a component A having at least one NCO-group-containing compound, for example from the group of polyisocyanates or NCO-containing prepolymers, and a second component B having at least one compound acting as a crosslinker, which compound comprises at least two functional groups reacting with NCO groups, for example OH groups, COOH groups, SH groups, or NH groups. Further adjuvants and additives can additionally be contained in the adhesive. The totality of all NCO-group-containing compounds is contained in component A in a quantity of more than 20 wt %, preferably more than 50 wt %, in particular preferably more than 80 wt %. The totality of the compounds acting as a crosslinker is contained in component B in a quantity of more than 20 wt %, preferably more than 50 wt %, in particular preferably more than 80 wt %.

These one-component and two-component polyurethane adhesives, which are notable for the fact that crosslinking and thus curing of the adhesive occur thanks to a reaction of the NCO groups, are also referred to as "NCO-reactive" adhesives.

Polyisocyanates that can be used for component A of the two-component polyurethane adhesives are polyisocyanates known per se, having two or more isocyanate groups. Suitable polyisocyanates are aromatic isocyanates, for example 1,5-naphthylene diisocyanate (NDI), 2,4'- or 4,4'-diphenylmethane diisocyanate (MDI), isomers of toluylene diisocyanate (TDI), methylenetriphenyl triisocyanate (MIT), or aliphatic isocyanates such as hydrogenated MDI (H12MDI), tetramethylxylylene diisocyanate (TMXDI), 1-isocyanatomethyl-3-isocyanato-1,5,5-trimethylcyclohexane (IPDI), xylylene diisocyanate (XDI), hexane-1,6-diisocyanate (HDI), dicyclohexylmethane diisocyanate. At least trifunctional isocyanates, which can be produced by trimerization or oligomerization of diisocyanates, can also be used.

Suitable NCO-containing prepolymers constituting component A are reaction products of OH-group-containing and/or NH-group-containing compounds with an excess of polyisocyanates. The polymers and polyisocyanates usable in synthesis of the polyurethane prepolymers are known to one skilled in the art. The above-described one-component polyurethane prepolymers can also be used, provided they have a suitable viscosity.

The polyol component can be of low molecular weight, for example from approx. 60 g/mol to 1500 g/mol, but higher-molecular-weight polymers can also be reacted, for example those having a molecular weight from 1500 to 50,000 g/mol, in particular from 1500 to 25,000 g/mol (number-average molecular weight MN as determinable by GPC). On average, two reactive groups are intended to be present on the polyol, for example diols. It is also possible to react compounds having multiple OH groups.

The reaction process can be influenced by the quantity of isocyanates. If a large excess of isocyanates is used, polyurethane prepolymer mixtures that can also contain as-yet unreacted diisocyanates are produced. Only a small increase in molecular weight is observed. If smaller quantities of isocyanates are used, or if the reaction is carried out in stages, it is known that the molecular weight of the prepolymers is increased as compared with the initial compounds. All in all, it is necessary in this case to ensure that an excess of isocyanate in terms of the total reaction is used. The polyol compound can be reacted with the isocyanates in a known manner.

Polyurethane prepolymers that have been manufactured on the basis of polyester polyols or polyether polyols, by reaction with diisocyanates, are particularly preferred as component A. As a rule the polyurethane prepolymers used in the context of the present invention have a molecular weight from 500 to approximately 30,000 g/mol, preferably up to 15,000 g/mol, in particular from 1000 to 5000 g/mol (number-average molecular weight MN as determinable by GPC). Another preferred embodiment uses aliphatic isocyanates and oligomers thereof as component A.

Component B of a preferred two-component polyurethane adhesive must contain at least one compound that comprises at least two groups reactive with respect to isocyanate groups. These can be, for example, COOH, SH, NH, or OH groups; polyols are particularly preferred, and these can also be mixtures of polyols having different chemical structures or different molecular weights. These compounds act as crosslinkers.

The suitable compounds that comprise at least two reactive groups can be used individually or as a mixture. The viscosity can be influenced by way of the selection of the constituents of component B. If polymeric polyols are used, B exhibits a higher viscosity. When portions of low-molecular-weight polyols are used, the viscosity is lower.

Suitable polymers for one-component polyurethane and two-component polyurethane adhesives, silane-crosslinking adhesives, or as TPUs that contain urethane groups as an adhesive, are known in principle to one skilled in the art. They are also commercially obtainable. These polymers can optionally also contain additives and then form the adhesive.

At least one low-molecular-weight compound (H) must be contained in an adhesive according to the present invention. Said compound is intended to act as an adhesion promoter. Compound (H) comprises at least one sulfonimide group or amidosulfonate group. Both groups can also be contained in the compound. Compounds (H) having a sulfonimide group are compounds that contain an $SO_2$—NH—C(O) structure. The compound is intended to have a molecular weight below 500 g/mol, in particular below 400 g/mol. These are low-molecular-weight compounds with no mass variation. The molecular weight is calculated on the basis of the molecular structure and can be determined experimentally with the aid of mass spectroscopy. Compound (H) can also comprise further functional groups, provided they do not result in curing of the adhesive system and provided the adhesive remains shelf-stable. They are intended to comprise an NH-acidic hydrogen atom. These can be linear compounds, but the sulfonimide or amidosulfonate groups are preferably present as a cyclic structure, generally as a five- or six-membered ring. The compound can be neutral, but salt-like compounds can also be present. A 1,2,3-oxathiazin-4(3H)-one-2,2-dioxide, optionally also substituted at carbon atoms 5 and/or 6, or an isothiazol-3(2H)-one-1,1-dioxide, optionally also substituted at carbon atoms 4 and/or 5, is intended in particular to be present as a cyclic structure. For example, one or more identical or different linear, branched, cyclic, or aromatic C1 to C12 alkyl substituents can be contained.

Suitable compounds having a sulfonimide structure or amidosulfonate structure are, for example, those of formulas I, II, III, IV, V, VI.

I) $R_1$—NH—$SO_3$H and salts thereof
where $R_1 = C_nH_{2n+1}$ (n=1 to 10), cyclohexyl, phenyl, alkyl-substituted cyclohexyl, or phenyl.

II) $R'_4$—$SO_2$—NH—C(O)—$R_4$
where $R_4$, $R'_4 = C_nH_{2n+1}$ (n=1 to 10), cyclohexyl, phenyl, alkyl-substituted cyclohexyl, or phenyl; or having $R_4$ and $R'_4$ such that they form a common, optionally alkyl-substituted $C_2$ or $C_3$ bridge as constituent of an aliphatic or aromatic five- or six-membered ring, wherein $R_4$, $R'_4$ can be identical or different.

III) $R'_5$—O—$SO_2$—NH—C(O)—$R_5$
where $R_5$, $R'_5 = C_nH_{2n+1}$ (n=1 to 10), cyclohexyl, phenyl, alkyl-substituted cyclohexyl, or phenyl; or having $R_5$ and $R'_5$ such that they form a common, optionally alkyl-substituted $C_2$ bridge as constituent of an aliphatic or aromatic six-membered ring, wherein $R_5$, $R'_5$ can be identical or different.

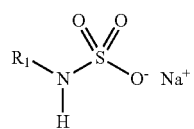

IV)

having $R_1$ as defined under I), as preferred embodiments of the compounds of formula I.

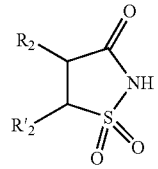

V)

where $R_2$, $R'_2 = C_nH_{2n+1}$ (n=1 to 10), cyclohexyl, phenyl, alkyl-substituted cyclohexyl, or phenyl; or having $R_2$ and $R'_2$ such that they form a common, optionally alkyl-substituted $C_3$ or $C_4$ bridge as constituent of an aliphatic or aromatic five- or six-membered ring, wherein $R_2$, $R'_2$ can be identical or different.

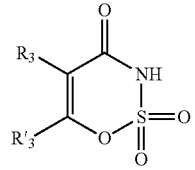

VI)

where $R_3$, $R'_3 = C_nH_{2n+1}$ (n=1 to 10), cyclohexyl, phenyl, alkyl-substituted cyclohexyl, or phenyl; or having $R_3$ and $R'_3$ such that they form a common, optionally alkyl-substituted $C_3$ or $C_4$ bridge as constituent of an aliphatic or aromatic five- or six-membered ring, wherein $R_3$, $R'_3$ can be identical or different.

Substituted amidosulfonates are particularly suitable, for example cyclohexylamidosulfonate, substituted or unsubstituted benzosulfimides (benzoic acid sulfimides), such as 1,2-benzisothiazol-3(2H)-one-1,1-dioxide, or alkyl-substituted 3,4-dihydro-1,2,3-oxathiazin-4-one-2,2-dioxides (1,2,3-oxathiazin-4(3H)-one-2,2-dioxides), such as 6-methyl-3,4-dihydro-1,2,3-oxathiazin-4-one-2,2-dioxide. Compounds of this kind are also commercially obtainable.

The adhesive according to the present invention is intended to contain compound (H) in a quantity from 0.01 to 10 wt %, in particular from 0.1 to 5 wt % based on the total adhesive. In a particular embodiment, those compounds H which are toxicologically unobjectionable are used. When mixtures of different compounds (H) are used, the limits indicated refer to the total quantity of said compounds (H).

It is useful for further constituents and additives, for example solvents, plasticizers, catalysts, resins, stabilizers, pigments, or fillers, optionally to be contained in the adhesives according to the present invention.

In an embodiment, a suitable adhesive can contain at least one tackifying resin. The resin produces additional tackiness. All resins that are compatible, i.e. that form a largely homogeneous mixture, can be used in principle. Plasticizers can also be contained, for example white mineral oils, naphthenic mineral oils, paraffinic hydrocarbon oils, polypropylene oligomers, polybutene oligomers, polyisoprene oligomers, hydrogenated polyisoprene oligomers and/or polybutadiene oligomers, phthalates, adipates, benzoate esters, vegetable or animal oils, and derivatives thereof. Those plasticizers which are unobjectionable in terms of food regulations are particularly suitable.

High-molecular-weight sterically hindered phenols, polyfunctional phenols, sulfur- and phosphorus-containing phenols or amines are suitable as optionally usable stabilizers or antioxidants.

It is optionally possible additionally to add silane compounds to the adhesive. Known organofunctional silanes such as (meth)acryloxy-functional, epoxy-functional, amine-functional, or non-reactively substituted silanes can be added. Silanes that exhibit only a low potential for endangering health are in particular to be selected. The quantity can be up to 10 wt %.

A reactive adhesive can also contain catalysts as an optionally additionally present additive. All known compounds that, for example, can catalyze the reaction between an OH group and NCO group can be used, for example metal compounds of Sn, Ti, Fe, Zn, Bi, Hg, Pb, or tertiary amines. The catalyst can be used in a quantity from 0 to 5 wt %, in particular 0.05 to approximately 1 wt %, in particular also 0%, based on the total weight of the adhesive.

A particular embodiment also adds pigments to the coating agents. These are finely particulate pigments, for example having a particle size <5 µm. An embodiment of the invention works with flake-shaped pigments that can be dispersed in one component of the binding agent. Another approach uses nanoparticles. These usually have a particle size <500 nm, in particular less than 100 nm. Such nanopigments can be, for example, ones based on $TiO_2$, $SiO_2$, $Fe_2O_3$, or similar oxides or oxyhydrates. Such pigments are known to one skilled in the art.

It is possible for the adhesives also to contain solvents. These are the usual solvents that can vaporize at temperatures of up to 120° C. The solvents can be selected from the group of aliphatic hydrocarbons, aromatic hydrocarbons, ketones, or esters. In another embodiment the adhesive is solvent-free; a further embodiment uses adhesive dispersions based on water.

In the adhesives, the known adjuvants and additives and/or the compound (H) can be contained in one or in both components, provided the components are shelf-stable with said additions. Solvents can be contained, for example as solvent-containing reactive one-component or two-component adhesives, but a particular embodiment of the invention operates in solvent-free fashion, for example as TPUs or one-component polyurethane hot melt adhesives, or as a one-component or two-component reactive adhesive. In the case of one-component adhesives, the latter can be applied directly. When two-component adhesives are used, they are to be mixed immediately before application.

Application of the adhesive can be effected using known apparatuses. These are known to one skilled in the art and can involve spray application, blade application, pressure application, roller application, or nozzles and other applicators.

When reactive adhesives are applied, they crosslink thereafter. Upon crosslinking a very high molecular weight or a network is created; additives that comprise OH groups or NH groups can optionally also become chemically incorporated into the network and then cannot migrate further.

In the particular embodiment as a laminating adhesive for adhesively bonding film substrates, it is useful to use a low-viscosity adhesive. Because the adhesives are particularly suitable for coating large areas, they are intended to have a low viscosity at the application temperature from approx. 10 to 75° C., up to 110° C. for hot melt adhesives. The viscosity of the adhesives according to the present invention, measured immediately after mixing of the constituents or as a one-component adhesive, is to be between 200 and 10,000 mPas at application temperature, preferably 500 to 3000 mPas (at 10 to 60° C., Brookfield viscometer, per EN ISO 2555).

A further subject of the invention is a method for adhesively bonding substrates using an adhesive according to the present invention, wherein the latter contains 0.05 to 10 wt % of a compound (H) that contains a sulfonimide group or amidosulfonate group. In accordance with the method according to the present invention a suitable adhesive is applied as a layer onto a substrate. The substrate can be cleaned and/or pretreated. The adhesive is to be applied at a layer thickness from 1 $g/m^2$ to 100 $g/m^2$, preferably from 2 to 35 $g/m^2$ (solids). A low application viscosity is to exist, for example from 200 to 10,000 mPas. In order to facilitate coating it is possible to heat the adhesive to an elevated temperature, in particular from 25 to 60° C., in the case of TPUs also up to 110° C. The adhesive can be applied onto one substrate, but both substrates can also be coated with the adhesive. In an embodiment of the method one substrate possesses a metal surface, as either a metal object or a metallized surface. The adhesive according to the present invention can in particular be applied onto the metal surface. The substrates are then brought together.

A preferred embodiment of the method adhesively bonds two film substrates to one another; these can be the film substrates described above. A substrate having a metal surface can preferably once again be used; another preferred form adhesively bonds an imprinted film surface. After bonding, when reactive adhesives are used, curing can optionally be accelerated by elevated temperature. Processing can be continued immediately after bonding to the second film layer. It has been found that, the multi-layer film can be quickly processed and/or packaged thanks to the rapid buildup of adhesion. Adhesion between the above-described film substrates is very good.

A further subject of the invention is a film substrate adhesively bonded with an adhesive according to the present invention. One substrate surface is to have a metallic surface or an imprinted plastic surface. These films have then been joined to other film materials to yield multi-layer films. The adhesive layers are largely colorless; i.e. even colorless films can be bonded without impairing the visual impression. Adhesion of the multi-layer substrates is good; a good bond is achieved even on imprinted surfaces that are difficult to bond.

The adhesive according to the present invention and the method make it possible to improve the adhesive bonding of two substrates. The adhesive bonding of metallic substrates in particular is improved. The adhesive bond exhibits good stability, and burdensome pretreatment of the substrates can be omitted.

In the particular case of adhesive bonding of film-shaped flexible substrates, a rapid buildup of adhesion is observed. The adhesive layer does not discolor in contact with the surfaces. Transparent film materials or metallized surfaces can also be used. Adhesion to imprinted film surfaces is also improved. The adhesive quickly develops a corresponding adhesive strength immediately after bonding. This ensures that rapid further processing of the multi-layer film is possible. As further processing, an adhesive bond can be provided with further films, a corresponding film can be imprinted, or packaging actions are carried out.

A further advantage results from the possibility that substances unobjectionable in terms of health can be selected as compound (H) in order to improve adhesion. The multi-layer substrates obtained according to the present invention are thus particularly suitable for utilization in packages for the food industry or the pharmaceutical industry. It has also been found that the adhesively bonded substrates exhibit improved adhesion even after sterilization, for example upon UV irradiation, heat sterilization, or steam sterilization.

Experiment Series I
Adhesive:

Component B contains a commercially available polyester prepolymer manufactured from isophthalic acid, adipic acid, diethylene glycol, 1,6-hexanediol, and glycerol (the hydroxyl number is 13 mg KOH/g, determined per DIN standard 53240:1971-12). In component B the polyester polymer is dissolved in ethyl acetate with a solids proportion of 66 wt %.

Viscosity: approx. 3500 mPas (Brookfield, LVT, per EN ISO 2555) at 20° C.

A two-component laminating adhesive is obtained by mixing component B with a component A made of an isocyanate hardener (Desmodur L75 and Desmodur N3300 at a weight ratio of approx. 2:1, as a 90% solution (wt % based on component A) in ethyl acetate containing 5 wt % of a silane adhesion promoter) at a B:A ratio=7.4:1 (weight).

The adhesive was applied by machine (50 m/min) at a weight per unit area (solid) of 3.5 g/m$^2$ at 45° C. onto an imprinted polyethylene terephthalate film. An aluminum foil was laminated onto the film thus coated. In a second step, a CPP film was laminated in the same manner onto the aluminum side of this composite.

The laminate was rolled up and stored at room temperature.

EXAMPLE 1 (COMPARISON)

A two-component adhesive of series I was applied.

EXAMPLE 2 (INVENTION)

1,2-Benzisothiazol-3(2H)-one-1,1-dioxide, in a quantity of 1.2 wt % based on component B, was additionally added to component B of the adhesive of Example 1 by stirring and dissolving at 75-80° C. The procedure was as in Example 1.

Test Results:

| Laminate and storage time | Example 1 (comparison) Bonding adhesion (N/15 mm) | Example 2 (invention) Bonding adhesion (N/15 mm) |
|---|---|---|
| Outer ply PET/Al, 14 d | 2.9 (bond separation) | >4.4 (PET crack) |
| Inner ply Al/CPP, 4 d | 3.8 (bond separation) | 4.8 (bond separation) |
| Inner ply Al/CPP, 7 d | 3.5 (bond separation) | 5.0 (bond separation) |
| Inner ply Al/CPP, 14 d | 3.6 (bond separation) | 5.0 (bond separation) |

| Laminate and storage time | Example 1 (comparison) Bonding adhesion at 90° C. (N/15 mm) | Example 2 Bonding adhesion at 90° C. (N/15 mm) |
|---|---|---|
| Inner ply Al/CPP, 14 d | 0.1 (bond separation) | 0.9 (bond separation) |
| Inner ply Al/CPP, 14 d and subsequent sterilization 45 min at 129° C. | 0.9 (bond separation) | 1.2 (bond separation) |

Bonding adhesion values were ascertained based on DIN standard EN 1895, a pulling rate of 100 mm/min and a sample width of 15 mm having been selected.

Bonding adhesion values in hot water (90° C.) were ascertained based on DIN standard EN ISO 11339, a pulling rate of 100 mm/min and a sample width of 15 mm having been selected. The specimens were aligned using a roll apparatus that was mounted in a chamber with hot water at 90° C.

It is apparent that Example 2 has significantly better values than the reference of Example 1 in all dimensions tested. The adhesively bonded layers are not discolored.

Experiment Series II

A two-component laminating adhesive is obtained by mixing component B with a component A made of an isocyanate hardener (Desmodur L75 and Desmodur N3300 at a weight ratio of approx. 2:1, as a 90% solution (wt % based on component A) in ethyl acetate) at a B:A ratio=2.7:1 (weight)

The adhesive was applied onto an imprinted polyethylene terephthalate film at 23° C. using a 15 µm handheld blade at a weight per unit area of approx. 8 g/m$^2$. Solvent was removed from the film for approx. 5 minutes at 90° C. in a drying cabinet. An aluminum foil was laminated onto the film thus coated. In a second step, a CPP film was laminated in the same manner onto the aluminum side of this composite. The laminate was rolled up and stored at room temperature.

EXAMPLE 3 (COMPARISON)

A two-component adhesive of series II was applied.

EXAMPLE 4 (INVENTION)

1,2-Benzisothiazol-3(2H)-one-1,1-dioxide, in a quantity of 2.5 wt % based on component B, was additionally added to component B of the adhesive of Example 3 by stirring and dissolving at 75-80° C. The procedure was as in Example 3.

Test Results:

| Laminate and storage time | Example 3 (reference) Bonding adhesion (N/15 mm) | Example 4 (invention) Bonding adhesion (N/15 mm) |
|---|---|---|
| Outer ply PET/Al, 4 d | 4.1 (bond separation) | 2.2 (bond separation) |
| Outer ply PET/Al, 7 d | 3.4 (bond separation) | 3.8 (bond separation) |
| Outer ply PET/Al, 14 d | 2.4 (bond separation) | 2.2 (bond separation) |
| Outer ply PET/Al, 4 d and subsequent sterilization 45 min at 129° C. | 0.1 (bond separation) | >3.4 (PET crack) |
| Outer ply PET/Al, 7 d and subsequent sterilization 45 min at 129° C. | 0.5 (bond separation) | 2.9 (bond separation) |
| Outer ply PET/Al, 14 d and subsequent sterilization 45 min at 129° C. | delamination | >4.0 (PET crack) |
| Inner ply Al/CPP, 4 d | 2.9 (bond separation) | >3.0 (Al tear) |

| Laminate and storage time | Example 3 (reference) Bonding adhesion (N/15 mm) | Example 4 (invention) Bonding adhesion (N/15 mm) |
|---|---|---|
| Inner ply Al/CPP, 7 d | 2.8 (Al tear) | >3.6 (Al tear) |
| Inner ply Al/CPP, 14 d | 3.5 (bond separation) | 2.8 (bond separation) |

It is apparent that Example 4 has values comparable to or better than the reference of Example 3 in all dimensions tested. Adhesion to the imprinted PET film in particular was appreciably increased, especially after sterilization.

The invention claimed is:

1. An adhesive for bonding plastic substrates and/or metal substrates, selected from liquid or thermoplastic adhesives that comprise urethane groups in the polymer chain, wherein the adhesive is selected from NCO-reactive adhesives, silane-reactive adhesives, or thermoplastic polyurethanes (TPUs) and contains as a constituent 0.01 to 10 wt % of at least one compound (H) having a molecular weight below 500 g/mol that comprises at least one sulfonimide group having an $SO_2$—NH—C(O) structure, or at least one amidosulfonate group.

2. The adhesive according to claim 1, wherein the compounds (H) comprise as a structure cyclic isothiazol-3(2H)-one-1,1-dioxide groups or 3,4-dihydro-1,2,3-oxathiazin-4-one-2,2-dioxide groups.

3. The adhesive according to claim 1, wherein the compounds (H) are present as a salt.

4. The adhesive according to claim 1, wherein the adhesive is solvent-containing, solvent-free, or is a dispersion adhesive.

5. The adhesive according to claim 4, wherein the adhesives are NCO-group-containing one-component or two-component polyurethane adhesives.

6. A method for adhesively bonding two substrates, comprising:
   optionally pretreating the substrates;
   applying an adhesive according to claim 1 onto at least one substrate; and
   joining the two substrates together under pressure with the adhesive therebetween.

7. The method according to claim 6, wherein at least one substrate comprises a metal surface or an imprinted surface.

8. The method according to claim 6, wherein the adhesive is applied onto a film-shaped substrate and is bonded to a film-shaped second substrate.

9. The method according to claim 6, wherein the adhesive is applied in a quantity from 1 to 100 g/m$^2$.

10. The method according to claim 6, wherein the substrates are multi-layer films for food packaging or pharmaceutical packaging.

* * * * *